United States Patent
Oh et al.

(10) Patent No.: US 12,411,745 B2
(45) Date of Patent: Sep. 9, 2025

(54) APPARATUS AND METHOD FOR AUTOMATICALLY COLLECTING RESEARCH DATA

(71) Applicant: KOREA INSTITUTE OF ROBOT AND CONVERGENCE, Pohang-si (KR)

(72) Inventors: Seung Sub Oh, Pohang-si (KR); Jeong Tack Min, Pohang-si (KR); Soo Beom Jeon, Pohang-si (KR); Su Han Lee, Pohang-si (KR); Seok Jae Lee, Pohang-si (KR); Seong Jin Yun, Pohang-si (KR)

(73) Assignee: KOREA INSTITUTE OF ROBOT AND CONVERGENCE, Pohang-si (KR)

( * ) Notice: Subject to any disclaimer, the term of this patent is extended or adjusted under 35 U.S.C. 154(b) by 0 days.

(21) Appl. No.: 18/398,653

(22) Filed: Dec. 28, 2023

(65) Prior Publication Data

US 2025/0208962 A1   Jun. 26, 2025

(30) Foreign Application Priority Data

Dec. 26, 2023   (KR) .................. 10-2023-0190722

(51) Int. Cl.
G06F 11/22   (2006.01)

(52) U.S. Cl.
CPC .................. *G06F 11/2268* (2013.01)

(58) Field of Classification Search
CPC .................................... G06F 11/2268
USPC ............................................ 714/45
See application file for complete search history.

(56) References Cited

U.S. PATENT DOCUMENTS

| | | | |
|---|---|---|---|
| 2012/0047489 A1* | 2/2012 | Varadharajan | G06F 11/3672 717/124 |
| 2012/0324414 A1* | 12/2012 | Tzoref-Brill | G01R 31/318371 716/136 |

FOREIGN PATENT DOCUMENTS

| | | |
|---|---|---|
| KR | 10-0959593 B1 | 5/2010 |
| KR | 10-2019-0130212 A | 11/2019 |
| KR | 10-2170968 B1 | 10/2020 |
| KR | 10-2022-0114780 A | 8/2022 |

* cited by examiner

*Primary Examiner* — Yair Leibovich
(74) *Attorney, Agent, or Firm* — Westman, Champlin & Koehler, P.A.; Amanda M. Prose

(57) ABSTRACT

Provided is a collecting apparatus. The collecting apparatus may include: a collector collecting test data generated in a specific test space; a data server keeping the test data generated in the specific test space, and a handler of an administrator.

17 Claims, 6 Drawing Sheets

APPARATUS AND METHOD FOR AUTOMATICALLY COLLECTING RESEARCH DATA

CROSS REFERENCE TO RELATED APPLICATION

This application claims priority to and the benefit of Korean Patent Application No. 10-2023-0190722 filed in the Korean Intellectual Property Office on Dec. 26, 2023, the entire contents of which are incorporated herein by reference.

TECHNICAL FIELD

The present disclosure relates to an apparatus and a method for collecting various data.

BACKGROUND

As the AI era continues to develop, the importance of collecting research data is increasing.

In order to improve the utilization value of the collected research data, the collected research data is preferably recyclable.

Data collection systems are required for recyclable accurate data collection. In particular, in the case of a system that needs to collect data from multiple measurement equipment and various sensors, a means to accurately collect and classify the data is required.

Korean Patent Unexamined Publication No. 2022-0114780 discloses a technology that processes informal research record information to automatically generate formal research record data.

SUMMARY

The present disclosure provides an apparatus and a method for automatically collecting various research data.

In an aspect, provided is a collecting apparatus which may include a collector collecting test data generated in a specific test space.

In the collecting apparatus of the present disclosure, a handler obtaining handle information including first identification information of the specific test space may be provided, the collector may obtain the handle information from the handler, and the collector may specify the specific test space in which the test data is to be collected by using the first identification information included in the handle information.

A sensing unit sensing the test data generated in the specific test space may be provided, a first storage unit storing the test data sensed by the sensing unit may be provided, a first management unit managing the sensing unit or the first storage unit using handle information obtained from a handler of an administrator may be provided, the first management unit may monitor whether the sensing unit normally operates, or monitor whether a storage space of the first storage unit is insufficient, and the first management unit may transmit the monitoring result to the handler.

The sensing unit sensing the test data generated in the specific test space may be provided, a movement unit equipped with the sensing unit, and formed to be physically drivable from an initial position to the specific test space may be provided, the first management unit controlling the sensing unit and the movement unit may be provided, when it is determined that the movement unit does not enter the specific test space, the first management unit may turn off the sensing unit, and when it is determined that the movement unit enters the specific test space, the first management unit may turn on the sensing unit.

When the sensor sensing the test data is disposed in the specific test space, a first communication unit which wiredly/wirelessly communicates with the sensor may be provided, the first storage unit storing the test data received from the sensor through the first communication unit may be provided, the first management unit controlling the first communication unit and the first storage unit may be provided, the first management unit may first store the test data received from the sensor in the first storage unit, the first management unit may determine an obtaining time corresponding to a time when the first communication unit obtains the test data apart from time information included in the test data itself, the first management unit may store the obtaining time in the first storage unit jointly with the test data, the first management unit may monitor a communication state between the first communication unit and the data server, and when the communication state meets a setting condition, the first management unit may control the first communication unit to transmit the test data stored in the first storage unit and the obtaining time to the data server.

A first storage unit storing the collected test data may be provided, a first communication which communicates with the data server, and a first management unit controlling the first communication unit may be provided, when the communication state between the first communication unit and the data server meets a setting condition, the first management unit may transmit the test data stored in the first storage unit to the data server, while the test data is transmitted to the data server, a situation in which the communication state does not meet the setting condition due to deterioration of the communication state is defined as an error situation, when the error situation occurs, the first management unit may stop the transmission of the test data to the data server, the first management unit may determine an occurrence time of the error situation, and when test data which is being transmitted to the data server at the occurrence time of the error situation is defined as first data, and test data already transmitted to the data server before a setting time from the occurrence time is defined as second data, the first management unit may transmit the test data to the data server in order from the second data instead of the first data when the communication state meets the setting condition again.

The first storage unit storing the collected test data may be provided, a first communication unit transmitting the test data stored in the first storage unit to the data server may be provided, a first management unit controlling the first communication unit may be provided, the first management unit may obtain, from the data server, missing information to determine whether the data is missing, and the first management unit may control the first communication unit to retransmit the test data to the data server when there is a difference between the data transmitted to the data server and the data received by the data server through analysis of the missing information.

The missing information may include time interval information, the first management unit may determine a specific time interval in which missing of data occurs by using the time interval information, and the first management unit may control the first communication unit to retransmit the test data transmitted at the specific time interval to the data server.

In another aspect, provided is a collecting apparatus which may include a data server keeping test data generated in a specific test space.

A second communication unit receiving the test data from a collector collecting the test data may be provided in the specific test space, and a second storage unit storing the test data received by the second communication unit may be provided.

A second management unit obtaining metadata including index information from a handler of an administrator may be provided, the second management unit may subdivide the test data received through the second communication unit to match the indexing information, the test data may be formed to be searched by using the indexing information through subdivision, and the second management unit may store the test data subdivided according to the indexing information in the second storage unit.

A second management unit monitoring a communication load of the second communication unit or an available capacity of the second storage unit may be provided, and the second management unit may determine whether to receive the test data according to the communication load or the available capacity.

A second management unit obtaining metadata from a handler of an administrator may be provided, the second management unit may predict a required capacity corresponding to a storage capacity required for storing the test data through analysis of the metadata, and the second management unit may allocate a space in which the test data is to be stored in the second storage unit when the second storage unit meets the required capacity.

The second management unit may determine first identification information of the specific test space through the analysis of the metadata, the second management unit may analyze an existing test data keeping history of the first identification information, and the second management unit may predict, as the required capacity, a capacity acquired by adding a value of a setting ratio to an average value of the existing storage capacity through the analysis of the keeping history.

A second management unit determining whether missing data is present when the test data is stored in the second storage unit may be provided, the second management unit may receive confirmation information used for confirming whether the missing data is present from the collector, the second management unit may compare related information of the test data stored in the second storage unit, and the confirmation information, and the second management unit may request retransmission of the missing data to the collector when it is determined that the missing data is present through the comparison between the related information and the confirmation information.

A second management unit monitoring a communication state between the collector and the second communication unit may be provided, and the second management unit may request the collector to transmit the test data after the collection of the test data is terminated when the communication state does not meet the setting condition.

A second management unit obtaining first identification information of the specific test space may be provided, the second management unit may determine second identification information of an object included in the specific test space s and generating the test data through the analysis of the first identification information or the test data, the second management unit may predict indexing information of the test data through the analysis of the second identification information, and the second management unit may automatically index the test data according to the indexing information.

A second management unit processing the test data received through the second communication unit may be provided, the second management unit may perform at least one of a first processing, a second processing, a third processing, a fourth processing, and a fifth processing, the first processing may include a process of deleting unnecessary among the test data, the second processing may include a processing of generating n-dimensional information (here, n is a natural number of 1 or more, and n<m) by using some of m-dimensional information (here, m is a natural number of 2 or more), the third processing may include a processing of graphing text information, the fourth processing may include a processing of calculating a representative of test data, and the fifth processing may include a processing of estimating a location of the tested body in an image or a moving picture included in the test data, or extracting a feature point for recognizing the tested body, and the second storage unit may store the original test data received through the second communication, and at the same time, additionally store the data processed by the second management unit.

A second management unit which receives a request for transmission the test data stored in the second storage unit from a handler of an administrator may be provided, the second management unit may extract test data matching the request of the handler from the second storage unit, the second management unit may schematize the test data extracted from the storage unit, and the second management unit may transmit the schematized test data to the handler.

In yet another aspect, provided is a collecting method which may include: an acquisition step of acquiring test data generated in a specific test space; a processing step of processing the test data; and a storing step of storing the original test data, and at the same time, additionally storing the processed data processed in the processing step, In the processing step, at least one of a first processing, a second processing, a third processing, a fourth processing, and a fifth processing may be performed.

The first processing may include a process of deleting unnecessary among the test data, the second processing may include a processing of generating n-dimensional information (here, n is a natural number of 1 or more, and n<m) by using some of m-dimensional information (here, m is a natural number of 2 or more), the third processing may include a processing of graphing text information, the fourth processing may include a processing of calculating a representative of test data, and the fifth processing may include a processing of estimating a location of the tested body in an image or a moving picture included in the test data, or extracting a feature point for recognizing the tested body.

The collecting apparatus and method of the present disclosure can collect various research data and test data to be recyclable.

Further, according to the present disclosure, the test data can be accurately collected from a plurality of measurement equipment and sensors without missing.

According to the present disclosure, research, experiments, and test data of experimental equipment used in various laboratories can be collected. The collection apparatus can receive the test data autonomously obtained by the experimental equipment. Alternatively, the collecting apparatus can directly sense the experimental process and experimental results of the experimental equipment and obtain the test data.

As a result, the collecting apparatus of the present disclosure can collect test data at various angles using its own sensors as well as various sensors present in the laboratory.

The collection apparatus of the present disclosure can include a variety of measures to deliver test data collected by a collector to a data server without missing any data.

The collecting apparatus of the present disclosure can intensively monitor a communication state between the collector and the data server. If the communication state does not meet a setting condition, such as a case where a transmission rate is less than a set value, the collector can stop the transmission of the test data to the data server. At this time, the collector does not transmit the collected test data to the data server, but can directly store the collected test data. If the communication state meets the setting condition, the collector can extract test data stored in a memory and transmit the extracted test data to the data server.

Due to the deterioration of the communication state, there may be other measures to prevent the missing of the test data delivered from the collector to the data server. For example, the collector can autonomously store the test data during the collection of the test data. The collector can transmit the test data to the data server after the collection of the test data is terminated.

In addition, the collection apparatus of the present disclosure can determine whether the test data is missing during a transmission process by comparing the test data collected by the collector and the test data received by the data server. When the test data is determined to be missing, the collector can retransmit the missed test data to the data server.

The collection apparatus of the present disclosure can process the collected test data to be recyclable afterwards.

As an example, the data server of the present disclosure can subdivide the test data based on index information of metadata generated by an administrator. According to this, users who need specific test data can easily extract targeted test data using related indexing information.

The data server can process the test data in a scheme that is easy to recognize from the viewpoint of a user that requires specific test data. For example, the data server can schematize the test data containing various figures and store the graph with original test data. Besides, the data server can process the test data in various schemes and store the original test data jointly with the processed data.

The data server can provide processed data easily recognized by the user when the user requests. The data server can provide the user with the original test data upon the user's additional request.

DETAILED DESCRIPTION

Figure 1:
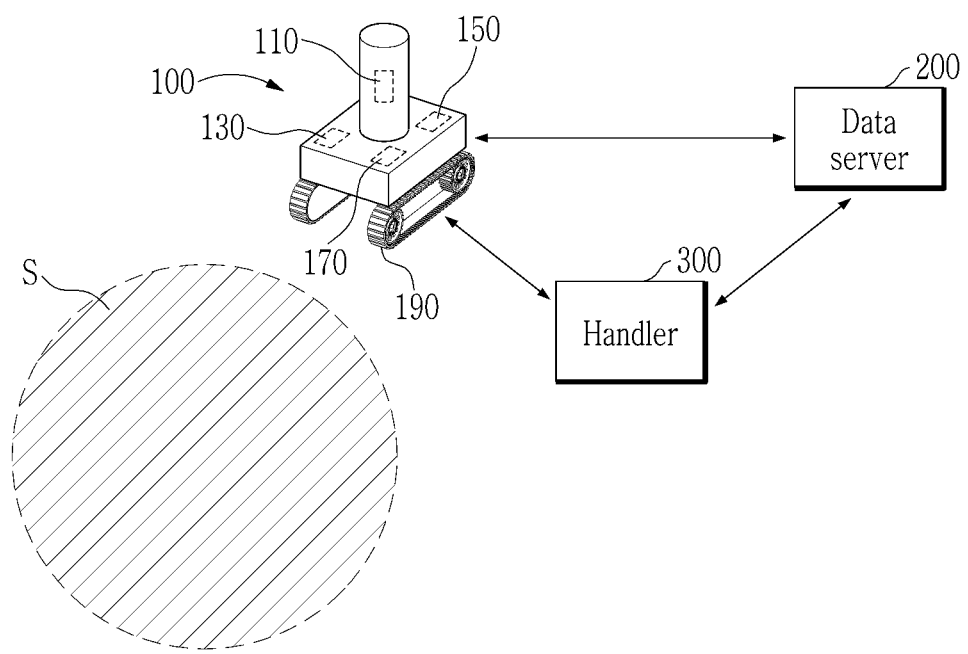
FIG. 1 is a schematic view illustrating a collecting apparatus of the present disclosure.

In the following detailed description, only certain exemplary embodiments of the present disclosure have been shown and described, simply by way of illustration. However, the present disclosure may be modified in various different ways, all without departing from the spirit or scope of the present disclosure. In addition, in the drawings, in order to clearly describe the present disclosure, a part not related to the description is not omitted and like reference numerals designate like elements throughout the present disclosure.

In the present disclosure, a redundant description for the same component is omitted.

It should be understood that, when it is described that a component is 'connected to' or 'accesses' another component, the component may be directly connected to or access the other component or a third component may be present therebetween. In contrast, when it is described that a component is 'directly connected to' or 'directly accesses' another component, it is understood that no element is present between the element and another element.

Terms used in the present disclosure are used only to describe specific embodiments, and are not used for an intention for limiting the present disclosure.

A singular form may include a plural form unless otherwise clearly meant in the contexts.

In the present application, it should be understood that the term 'include' or 'have' indicates that a feature, a number, a step, an operation, a component, a part or the combination thereof described in the present disclosure is present, but does not exclude a possibility of the presence or addition of one or more other features, numbers, steps, operations, components, parts or combinations thereof, in advance.

Further, in the present disclosure, the term 'and/or' includes a combination of a plurality of disclosed items or any item of the plurality of disclosed items. In the present disclosure, 'A or B' may include 'A', 'B', or 'A and B'.

Further, in the present disclosure, the detailed description of publicly-known function and configuration that may make the gist of the present disclosure unnecessarily ambiguous will be omitted.

FIG. 1 is a schematic view illustrating a collecting apparatus of the present disclosure.

The collecting apparatus 100 illustrated in FIG. 1 may include a data server 200 and a handler 300.

The collector 100 may collect test data generated in a specific test space s. Various test data may be generated in a field where various tests are performed. As an example, in a field where movement of a robot is tested, physical features (including a chemical feature) including a movement path, a movement speed, etc., of the robot may correspond to the test data.

The collector 100 may obtain and collect data from various types of sensors. To this end, the collector 100 may be communicatively connected to one or more sensors.

A plurality of collectors 100 may be provided. In this case, times to match each other may be set in the plurality of collectors 100. Through this, temporal synchronization between test data collected by the respective collectors 100 is possible. In other words, the collector 100 may collect various types of test data output from the sensors in a temporal synchronization state.

The collector 100 may transmit the test data to the data server 200 by various schemes according to a data processing speed and a communication speed.

The collector 100 may perform the above functions according to an instruction of the handler 300.

The data server 200 may keep the test data generated in a specific test space s.

A first storage unit 130 storing or keeping the test data may be provided in the collector 100. However, a storage capacity of the first storage unit 130 may be extremely limited. Therefore, the collector 100 having the limited storage capacity may transmit the test data to the data server 200, and then delete the corresponding test data.

Unlike this, a second storage unit 230 provided in the data server 200 may have a storage capacity to keep the test data for several years or more or semi-permanently. Due to such a feature, the data server 200 may be a search target of a user who requires test data corresponding to a result of the existing test afterwards.

The data server 200 may acquire basic data related to the test data from the handler 300, and allocate a storage space of the second storage space 230 in accordance with a data collection item.

The data server 200 may store the test data collected from the collector 100 in accordance with a feature of the sensor. For example, when the test data is a temperature, and the sensor has a feature of measuring the temperature in units of Fahrenheit, and the data server 200 may store the test data in units of Fahrenheit.

The data server 200 may determine whether data stored in the second storage unit 230 is missing after the test is terminated. When the data is missing, the data server 200 may notify the corresponding fact to the handler 300.

The data server 200 may process the test data to display a final result indicated by the test data by different schemes, and display the corresponding processing result to the handler 300.

The handler 300 may include various terminals manipulated by an administrator of the collector 100 or the data server 200. The corresponding terminal may include a personal computer, a laptop, a mobile communication terminal, a tablet computer, etc.

The handler 300 may control the collector 100 or control the data server 200 according to the manipulation of the administrator.

As an example, the handler 300 may set a test space in which the test data is to be collected. The handler 300 may set the type of data to be collected in a specific test space, e.g., temperature, speed, humidity, location, etc. The handler 300 may generate metadata for indexing the test data to be stored in the data server 200, and provide the metadata to the data server 200. The test data indexed through the handler 300 may be easily searched by the user afterwards.

The administrator may set a method of an experiment or a test performed in a specific test space by using the handler 300.

The handler 300 may be input with handle information related to which sensor is used for the experiment, which data in the sensor is used for the experiment, how long the test is performed, etc., from the administrator. The handler 300 may deliver the handle information obtained from the administrator to the collector 100. Alternatively, the handler 300 may generate a control signal based on the handle information, and deliver the generated control signal to the collector 100.

The handler 300 may manage state information of the sensor. When receiving a collection instruction of the administrator, the handler 300 may generate and manage handle information including the collection instruction in the form of the metadata. The handler 300 may provide the handle information to the collector 100. In addition, the handler 300 may control and manage to the data server 200 so as for the data server 200 to perform a preparation to store the test data.

The handler 300 may generate metadata including a collection cycle, a collection time, a collection method, etc., of the test data according to a purpose of each test. Further, the handler 300 may provide information on each test to the data server 200 in advance. The handler 300 may make the data server 200 prepare for allocating a storage space in advance by considering a format, a size (capacity), etc., of test data to be collected.

Figure 2:
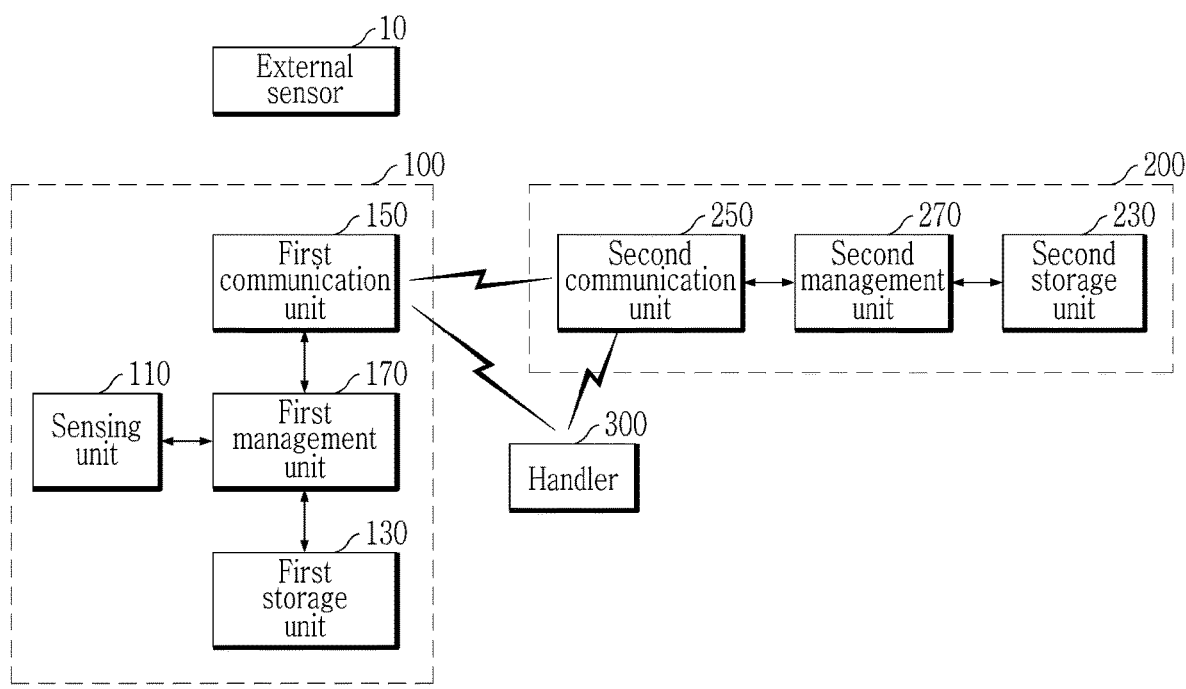
FIG. 2 is a block diagram illustrating the collecting apparatus.

FIG. 2 is a block diagram illustrating the collecting apparatus.

The handler 300 may obtain handle information. The handle information may include first identification information corresponding to identification information of a specific test space S.

The collector 100 may obtain the handle information from the handler 300.

The collector 100 may specify a specific test space in which the test data is to be collected by using the first identification information included in the handle information. When the first identification information is used, a test space in which the test is currently performed may be accurately specified in a situation in which there are a plurality of test spaces.

A sensing unit 110, a first storage unit 130, a first communication unit 150, a first management unit 170, and a movement unit 190 may be provided in the collector 100.

The sensing unit 110 may sense test data generated in a specific test space. A sensor that senses and measures various test data may be provided in the sensing unit 110. Alternatively, a communication module which wiredly/wirelessly communicates with various sensors present in the specific test space s may be provided in the sensing unit 110. In the latter case, the sensing unit 110 may receive the test data measured by the sensor.

The first storage unit 130 may store the test data sensed by the sensing unit 110. A memory semiconductor storing various digital information and analog information may be provided in the first storage unit 130.

The first management unit 170 may manage the sensing unit 110 or the first storage unit 130 by using the handle information obtained from the handler 300 of the administrator. As an example, the first management unit 170 may monitor whether the sensing unit 110 normally operate. Alternatively, the first management unit 170 may monitor whether the storage space of the first storage unit 130 is insufficient. The first management unit 170 may transmit a monitoring result to the handler 300. A display displaying the monitoring result or a speaker may be provided in the handler 300. The administrator who recognizes the monitoring result through the handler 300 may take an appropriate measure to solve a malfunction problem of the sensing unit 110 or an insufficient problem of the storage space.

According to a situation, the collector 100 may be formed in the form of a robot which physically moves. To this end, a movement unit 190 equipped with the sensing unit 110 may be provided. The movement unit 190 may include a wheel or an infinite orbit that is in roll-contact with the ground. An actuator that rotates the wheel or the infinite orbit may be provided in the movement unit 190. Alternatively, the movement unit 190 may be formed to be movable along a rail formed on a floor, a wall, and a ceiling.

The movement unit 190 may be formed to be physically drivable from an initial position to the specific test space s.

In this case, the first management unit 170 may control the sensing unit 110 and the movement unit 190.

When the first management unit 170 determines that the movement unit 190 does not enter the specific test space s, the first management unit 170 may turn off the sensing unit 110.

When the first management unit 170 determines that the movement unit 190 enters the specific test space s, the first management unit 170 may turn on the sensing unit 110.

A sensor sensing the test data may be disposed in the specific test space s. The sensor may be mounted on various measurers provided in the corresponding test space. In this case, the sensor may be referred to as an external sensor 10. Unlike this, the sensor may be mounted on the sensing unit 110.

In this case, the first communication unit 150 may wiredly/wirelessly communicate with the sensor. Further, the first communication unit 150 may wiredly/wirelessly communicate with the data server 200 or the handler 300. To this end, various wired/wireless communication modules such as Wi-Fi, Bluetooth, Zigbee, Ethernet, etc., may be provided in the first communication unit 150.

The first storage unit 130 may store the test data received from the sensor through the first communication unit 150. The first management unit 170 may control the first communication unit 150 and the first storage unit 130.

The first management unit 170 may first store the test data received from the sensor in the first storage unit 130.

The first management unit 170 may determine an obtaining time corresponding to a time when the first communication unit 150 obtains the test data apart from time information included in the test data itself.

The first management unit 170 may store the corresponding obtaining time in the first storage unit 130 jointly with the test data.

The first management unit 170 may monitor a communication state between the first communication unit 150 and the data server 200.

When the communication state meets a setting condition, the first management unit 170 may control the first communication unit 150 to transmit the test data and the obtaining time stored in the first storage unit 130 to the data server 200. As an example, the first management unit 170 may transmit the test data and the obtaining time information to the data server 200 only when a transmission rate indicating a transmission capacity per time between the first communication unit 150 and the data server 200 meets a setting value. According to the exemplary embodiment, while the transmission rate is sufficiently ensured, data transmission may be performed, and a data missing phenomenon caused by a low transmission rate may be certainly prevented. Further, when the obtaining time information automatically granted by the collector 100 is used, a plurality of test data collected from a plurality of collectors 100 may be temporally synchronized.

While the test data is transmitted to the data server 200, a situation in which the communication state does not meet the setting condition due to the deterioration of the communication state may be defined as an error situation.

When the error situation occurs, the first management unit 170 may stop transmission of the test data to the data server 200.

The first management unit 170 may determine an occurrence time of the error situation.

The test data which is being transmitted to the data server 200 at the occurrence time of the error situation may be defined as first data. Test data already transmitted to the data server 200 before a setting time from the occurrence time of the error situation may be defined as second data.

When the communication state meets the corresponding setting condition again, the first management unit 170 may transmit the test data to the data server 200 in order from the second data instead of the first data. According to the exemplary embodiment, when the communication state is normalized after the deterioration, test data already safely transmitted before data to be transmitted at the time when the communication state is deteriorated may be first transmitted to the data server 200 again. According to the exemplary embodiment, up to a missing phenomenon of data which may occur before and after the deterioration of the communication state may be perfectly prevented.

After the transmission of the test data to the data server 200 is performed, the first management unit 170 may obtain, from the data server 200, missing information to determine whether the test data is missing.

The first management unit 170 may determine whether there is a difference between the data transmitted to the data server 200 and the data received by the data server 200 through analysis of the missing information. The first management unit 170 may control the first communication unit 150 to retransmit the test data to the data server 200 when there is difference between the data transmitted to the data server 200 and the data received by the data server 200.

For example, the first management unit 170 may receive original test data stored in the data server 200, and compare the received original test data and the test data stored in the first storage unit 130. In this case, the original test data received from the data server 200 may correspond to the missing information.

The first management unit 170 may determine whether there is a missing content in the original test data stored in the data server 200 through the comparison at that time. The first management unit 170 may extract test data corresponding to the determined missing content from the first storage unit 130, and retransmit the extracted test data to the data server 200.

In order to reduce a communication load according to the retransmission of the missing data, the missing information may include time interval information.

The first management unit 170 may determine a specific time interval in which data is missing by using the time interval information.

The first management unit 170 may control the first communication unit 150 to retransmit test data in the specific time interval to the data server 200.

For example, the missing information may include a first bit number of the test data received from the collector 100 during each interval divided according to the time interval information.

The first management unit 170 may determine a second bit number of the test data transmitted to the data server 200 during each interval divided according to the corresponding time interval information. The first management unit 170 may compare the first bit number and the second bit number. The first management unit 170 may transmit the test data transmitted to the data server 200 during the corresponding time interval again when the first bit number and the second bit number are different from each other.

A second communication unit 250, a second management unit 270, and a second storage unit 230 may be provided in the data server 200 keeping test data generated in a specific test space.

The second communication unit 250 may receive the test data from the collector 100 that collects the test data in the specific test space. The second communication unit 250 may be formed to be communicatable with the handler 300 in addition to the collector 100. To this end, various wired/wireless communication modules may be provided in the second communication unit 250.

The second storage unit 230 may store the test data received by the second communication unit 250. The first storage unit 130 may include a memory semiconductor storing various digital information and analog information.

The second management unit 270 may obtain metadata including indexing information from the handler 300 of the administrator.

The second management unit 270 may subdivide the test data received through the second communication unit 250 to match the indexing information. The test data may be formed to be searched by using the indexing information through subdivision.

The second management unit 270 may store the test data subdivided according to the indexing information in the second storage unit 230.

The second management unit 270 may monitor a communication load of the second communication unit 250 or an available capacity of the second storage unit 230.

The second management unit 270 may determine whether to receive the test data according to the communication load or the available capacity.

The second management unit 270 may predict a required capacity corresponding to a storage capacity required for storing the test data through analysis of the metadata.

The second management unit 270 may allocate a space in which the test data is to be stored in the second storage unit 230 when the second storage unit 230 meets the required capacity.

The second management unit 270 may deliver a message for requesting transmission stop of the test data to the collector 100 when it is confirmed that the required capacity is not present in the second storage unit 230.

The second management unit 270 may transmit a fact that the required capacity is not present to the handler 300.

The second management unit 270 may determine the first identification information of the specific test space through the analysis of the metadata.

The second management unit 270 may analysis an existing test data keeping history of the first identification information.

The second management unit 270 may predict, as the required capacity, a capacity acquired by adding a value of a setting ratio to an average value of the existing storage capacity through the analysis of the keeping history.

The second management unit 270 may determine whether the missing data is present when the test data is stored in the second storage unit 230.

The second management unit 270 may receive confirmation information used for confirming whether the presence of the missing data from the collector 100.

The second management unit 270 may compare related information of the test data stored in the second storage unit 230 and the confirmation information.

When it is determined that the missing data is present by comparing the corresponding related information and the confirmation information, the second management unit 270 may request retransmission of the missing data to the collector 100.

Unlike the exemplary embodiment, the first management unit 170 may also determine whether the missing data is present as described above.

The second management unit 270 may monitor a communication state between the collector 100 and the second communication unit 250.

When the corresponding communication state does not meet a setting condition, the second management unit 270 may request the collector 100 so as for the collector 100 to transmit the test data after terminating the collection of the test data.

The second management unit 270 may determine second identification information of an object included in the specific test space s and generating the test data through the analysis of the first identification information or the test data. For example, the corresponding object may include various measurers, testers, tested bodies, etc., which output the test data.

The second management unit 270 may predict indexing information of the test data through the analysis of the second identification information. For example, it is assumed that the tested body is a robot that moves in an x-axis direction and a y-axis direction through the second identification information. In this case, the second management unit 270 may automatically predict or extract a measurement time, an x-axis direction location, and a y-axis direction location as the indexing information.

The second management unit 270 may automatically index the test data according to the indexing information. According to the exemplary embodiment, even though the administrator does not provide the indexing information of the test data through the handler 300, the test data may be stored in the second storage unit 230 according to the automatically predicted indexing information. Afterwards, a user who requires the test data may easily search and recycle data desired thereby by using the corresponding indexing information.

The second management unit 270 may process the test data received through the second communication unit 250.

Specifically, the second management unit 270 may perform at least one of a first processing, a second processing, a third processing, a fourth processing, and a fifth processing.

The first processing may include a processing of deleting unnecessary data among the test data. A tester and a measurer for a specific test may be provided in a specific test space. When a sensor is provided in the corresponding tester or measurer, the corresponding sensor may sense the test data according to operations of the tester and the measurer. However, the sensor may be provided in the collector 100 which is present apart from the tester or the measurer. In this case, the collector 100 may have difficulty determining a time when the tester or the measurer does not operate intermittently during a test process. Accordingly, the collector 100 may collect the test data continuously from a test start time to a start end time.

An interval in which the test data itself is not generated due to various causes during a test period is defined as a dummy interval.

The test data collected continuously from the test start time to the start end time may also include data of the dummy interval. In this case, the test data of the dummy interval may correspond to dummy data which is not actually meaningful.

The dummy data should be excluded to reduce the storage capacity and prevent confusion of the user. As a result, the second management unit 270 may perform a processing of deleting the dummy data among the test data received from the collector 100.

The second processing may include a processing of generating n-dimensional information (here, n is a natural number of 1 or more, and n<m) by using some of m-dimensional information (here, m is a natural number of 2 or more). A value of the dimension is reduced to provide test data which may be intuitively recognized to the user.

As an example, a laser tracker may collect 3-dimensional information of x, y, z, and t (time) in a 3-dimensional space having three coordinate axes x, y, and z orthogonal to each other. In this case, the corresponding 3D information which corresponds to the test data may be received by the data server 200.

The second management unit 270 may perform the second processing of expressing the corresponding 3D information as a 2D of x and y. Since the second-processed data has a smaller data amount than original data, the second-processed data may assist users in determining whether the second-processed data is data desired by the user The third processing may include a processing of graphing text information (including a number expressed by text).

As an example, the second management unit 270 may perform the third processing of expressing 2D data of x and y which is second-processed above by a graph. The user may intuitively determine plane movement of a tested body targeted by the laser tracker through the third-processed graph. The user who recognizes the corresponding plane movement may rapidly determine whether the corresponding test data is desired by the user.

The second management unit 270 may perform a mathematical processing such as differentiation (partial differentiation), integration, etc., which is advantageous for graphing when it is difficult to graph the test data itself. The second management unit 270 may express a mathematically processed value as the graph.

The fourth processing may include a process of calculating a representative value of the test data.

As an example, the second management unit 270 may perform a fourth processing of calculating a representative value such as an average value, a distribution value, a standard deviation value, etc., of the test data. The corresponding representative value may assist users in searching test data desired by the user. The representative value may be used for comparing test results of a plurality of tested bodies.

The fifth processing may include a processing of estimating a location of the tested body in an image or a moving picture included in the test data, or extracting a feature point for recognizing the tested body.

A camera may be used as the sensor that senses the test data. In this case, the test data may include the image or the moving picture. It may take an enormous amount of time to look at numberless images and moving picture. Therefore, it is very difficult to find data desired by the user among numerous images or moving pictures from the user's point of view.

According to the fifth processing, the feature point of the image or the moving picture may be extracted, and the user may easily search the test data desired thereby through searching of the corresponding feature point.

The second storage unit 230 may store the original test data received through the second communication unit 250, and at the same time, additionally store data processed by the second management unit 270.

The second management unit 270 may request transmission of the test data stored in the second storage unit 230 from the handler 300 of the administrator.

The second management unit 270 may extract test data matching the request of the handler 300 from the second storage unit 230.

The second management unit 270 may schematize the test data extracted from the storage unit. The second management unit 270 may transmit the schematized test data to the handler 300. According to this, test data expressed as a graph instead of the test data expressed by various numbers may be display on a display of the handler 300. The administrator may easily confirm test data to be kept through the corresponding graph.

Figure 3:
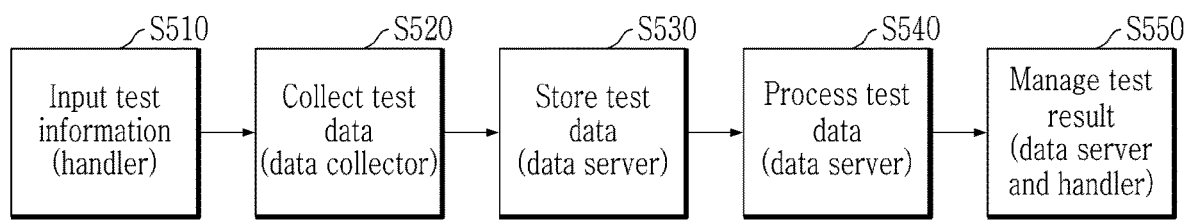
FIG. 3 is a schematic view illustrating an operation of the collecting apparatus.

FIG. 3 is a schematic view illustrating an operation of the collecting apparatus.

The administrator may input various test information related to the test by using the handler 300. The corresponding test information may be obtained as handle information by the handler 300 (S 510). In order to receive the corresponding test information, various input means such as a touch screen, a keyboard, etc., may be provided in the handler 300.

The handle information may be delivered to the collector 100, and the collector 100 may collect various test data generated in the specific test space s by using the handle information (S 520).

The data server 200 may receive the test data from the collector 100, and store the received test data in the second storage unit 230 (S 530).

The second management unit 270 of the data server 200 may process the received test data (first processing, second processing, third processing, fourth processing, fifth processing, etc.) (S 540). The processed data may be stored in the second storage unit 230 jointly with the original test data.

The data server 200 may schematize the test data as a form such as the graph, and transmit the test data to the handler 300 (S 550). The administrator may confirm the graph displayed through the handler 300, and confirm a collection state of targeted test data.

Figure 4:
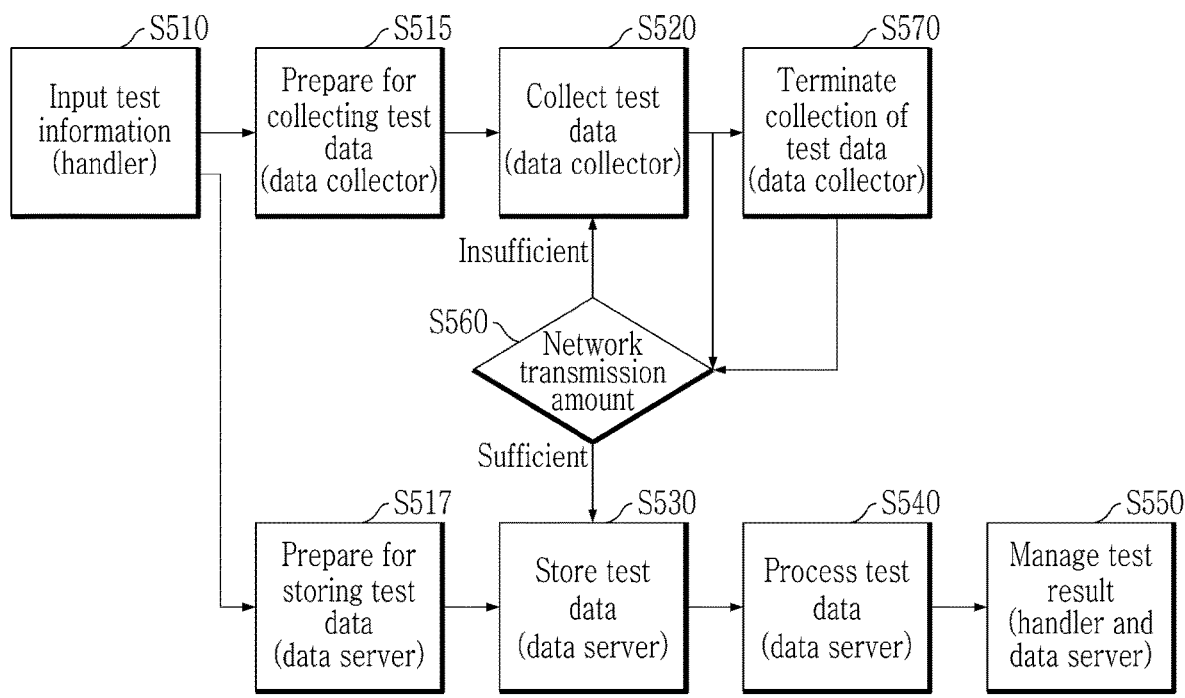
FIG. 4 is a schematic view illustrating another operation of the collecting apparatus.

FIG. 4 is a schematic view illustrating another operation of the collecting apparatus.

The handler 300 that obtains test information input by the user (S 510) may transmit the handle information to the collector 100 and the data server 200.

The collector 100 which receives the handle information may prepare for collection of the test data (S 515). As an example, the first management unit 170 of the collector 100 may confirm whether a sensor collecting data requested by the handle information normally operates. Alternatively, the first management unit 170 may confirm whether a storage capacity of the first storage unit 130 which is to temporarily store the test data is sufficient.

The collector 100 that collects the test data (S 520) may transmit the collected test data to the data server 200 when a communication state (a network transmission rate, etc.) with the data server 200 is excellent (S 560). When the communication state is poor, the collector 100 may stop transmission of the test data to the data server 200, and collect the test data.

When the communication state becomes excellent again, or the collection of the test data is terminated (S 570), the collector 100 may transmit the remaining test data to the data server 200.

The data server 200 that receives the handle information from the handler 300 may prepare for storing the test data (S 517).

For example, the second management unit 270 may provide a storage space in which a format (a format type of a stored file, such as mp3, wav, txt, etc.) of the test data, and specification information (a frame per second, a resolution, a compression format, a vendor, a model name, an iris number, etc., in the case of the moving picture) of a sensor collecting the test data are to be stored in the second storage unit 230 in advance.

The second management unit 270 may predict a space (required capacity) required for storing the test data, and allocate the corresponding required capacity to the second storage unit 230. Further, the second management unit 270 may allocate a path of the storage space for each index. For example, the second management unit 270 may create a folder having a name such as video, audio, Lidar, etc., and prepare for the path of the corresponding folder to be searched by using the metadata.

Thereafter, the second management unit 270 may store the test data (S 530), or process the test data (S 540). The second management unit 270 may perform test result management of reporting at least some of the stored test data to the handler 300 (S 550).

Figure 5:
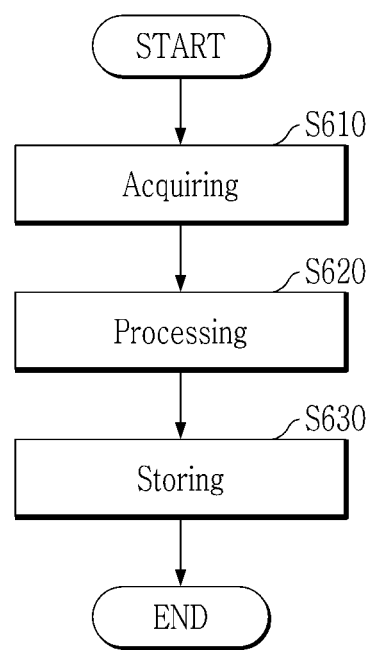
FIG. 5 is a flowchart illustrating a collecting method of the present disclosure.

FIG. 5 is a flowchart illustrating a collecting method of the present disclosure.

The collecting method of FIG. 5 may be performed by the collecting apparatus illustrated in FIG. 1 or the data server 200 of FIG. 2.

The collecting method may include an acquisition step (S 610), a processing step (S 620), and a storing step (S 630).

In the acquisition step (S 610), test data generated in a specific test space may be acquired. The acquisition step (S 610) may be performed by the second communication unit 250.

The processing step (S 620) may process the test data. The processing step (S 620) may be performed by the second management unit 270.

The processing step (S 620) may perform at least one of a first processing, a second processing, a third processing, a fourth processing, and a fifth processing.

The first processing may include a processing of deleting unnecessary data among the test data.

The second processing may include a processing of generating n-dimensional information (here, n is a natural number of 1 or more, and n<m) by using some of m-dimensional information (here, m is a natural number of 2 or more).

The third processing may include a process of graphing text information.

The fourth processing may include a process of calculating a representative value of the test data.

The fifth processing may include a processing of estimating a location of the tested body in an image or a moving picture included in the test data, or extracting a feature point for recognizing the tested body.

In the storing step (S 630), original test data may be stored, and at the same time, processed data processed in the processing step may be additionally stored (S 630). The storing step (S 630) may be performed by the second management unit 270 or performed by the second storage unit 230. A space in which the original test data and the processed data are stored may be the second storage unit 230.

Figure 6:
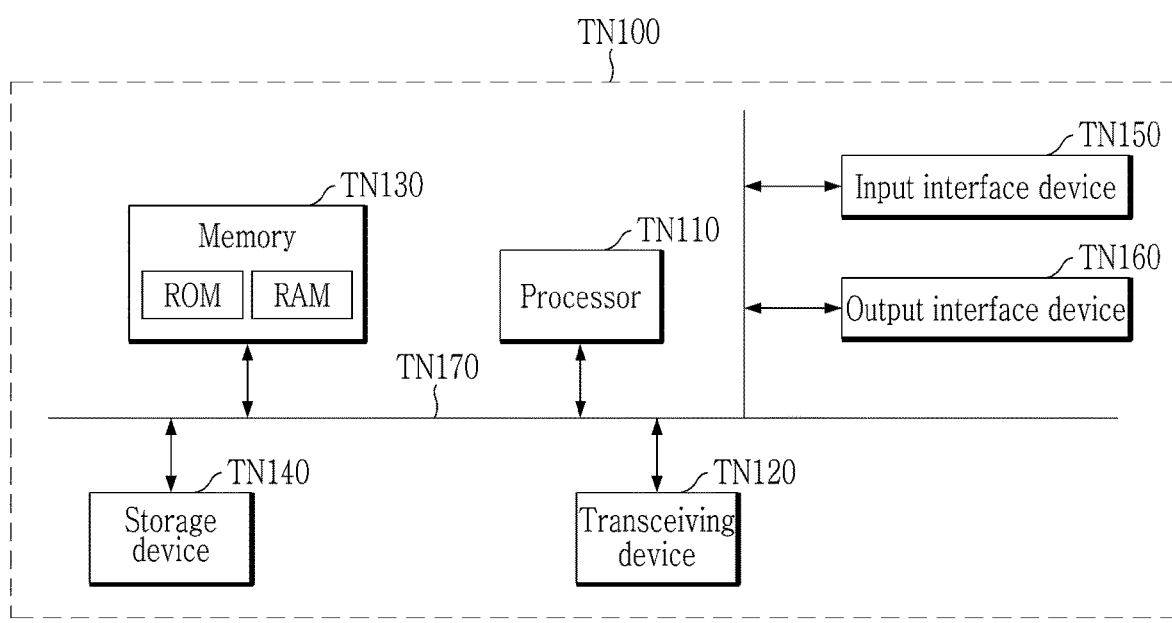
FIG. 6 is a diagram illustrating a computing device according to an exemplary embodiment of the present disclosure.

FIG. 6 is a diagram illustrating a computing device according to an exemplary embodiment of the present disclosure. The computing device TN100 of FIG. 6 may be an apparatus (e.g., a collecting apparatus, etc.) described in the present disclosure.

In the exemplary embodiment of FIG. 6, the computing device TN100 may include at least one processor TN110, a transceiving device TN120, and a memory TN130. Further, the computing device TN100 may further include a storage device TN140, an input interface device TN150, and an output interface device TN160, etc. Components included in the computing device TN100 may be connected by a bus TN170 and may perform communication with each other.

The processor TN110 may execute a program command stored in at least one of the memory TN130 and the storage device TN140. The processor TN110 may mean a central processing unit (CPU), a graphics processing unit (GPU), or a dedicated processor performing the methods according to the exemplary embodiments of the present disclosure. The processor TN110 may be configured to implement a procedure, a function, and a method described in relation to the exemplary embodiment of the present disclosure. The processor TN110 may control each component of the computing device TN100.

Each of the memory TN130 and the storage device TN140 may store various information related to the operation of the processor TN110. Each of the memory TN130 and the storage device TN140 may be configured as at least one of a volatile storage medium and a non-volatile storage medium. For example, the memory TN130 may be configured as at least one of a read only memory (ROM) and a random access memory (RAM).

The transceiving device TN120 may transmit or receive a wired signal or a wireless signal. The transceiving device TN120 may be connected to the network and perform communication.

Meanwhile, the exemplary embodiments of the present disclosure are not limited to the above-described apparatus and/or method, but may be implemented through a program for implementing functions corresponding to the configuration of the exemplary embodiment of the present disclosure, a recording medium on which the program is recorded, and the like and the present disclosure can be easily implemented by those skilled in the art from the description of the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A collecting apparatus comprising:
    at least one processor and at least one memory comprising instructions stored thereon which when executed by the at least one processor configure a collector collecting test data generated in a specific test space,
    a sensing unit sensing the test data generated in the specific test space,
    a first storage unit storing the test data sensed by the sensing unit,
    a first management unit managing the sensing unit or the first storage unit using handle information obtained from a handler of an administrator,
    the first management unit monitors whether the sensing unit normally operates, or monitors whether a storage space of the first storage unit is insufficient, and
    the first management unit transmits a monitoring result to the handler.

2. The collecting apparatus of claim 1, and further comprising a handler obtaining handle information including first identification information of the specific test space,
    the collector obtains the handle information from the handler, and
    the collector specifies the specific test space in which the test data is to be collected by using the first identification information included in the handle information.

3. The collecting apparatus of claim 1, and further comprising:

a movement unit equipped with the sensing unit, and formed to be physically drivable from an initial position to the specific test space, a first management unit controlling the sensing unit and the movement unit, when it is determined that the movement unit does not enter the specific test space, the first management unit turns off the sensing unit, and when it is determined that the movement unit enters the specific test space, the first management unit turns on the sensing unit.

4. The collecting apparatus of claim 1, further comprising:

a sensor sensing the test data disposed in the specific test space, a first communication unit which communicates with the sensor via a wired or wireless link, a first storage unit storing the test data received from the sensor through the first communication unit, a first management unit controlling the first communication unit and the first storage unit, wherein the first management unit first stores the test data received from the sensor in the first storage unit, the first management unit determines an obtaining time corresponding to a time when the first communication unit obtains the test data apart from time information included in the test data itself, the first management unit stores the obtaining time in the first storage unit jointly with the test data, the first management unit monitors a communication state between the first communication unit and a data server, and when the communication state meets a setting condition, the first management unit controls the first communication unit to transmit the test data stored in the first storage unit and the obtaining time to the data server.

5. The collecting apparatus of claim 1, and further comprising a first storage unit storing the collected test data, a first communication unit which communicates with a data server, and a first management unit controlling the first communication unit, when a communication state between the first communication unit and the data server meets a setting condition, the first management unit transmits the test data stored in the first storage unit to the data server, while the test data is transmitted to the data server, a situation in which the communication state does not meet the setting condition due to deterioration of the communication state is defined as an error situation, when the error situation occurs, the first management unit stops the transmission of the collected test data to a data server, the first management unit determines an occurrence time of the error situation, and when the test data which is being transmitted to the data server at the occurrence time of the error situation is defined as first data, and the test data already transmitted to the data server before a setting time from the occurrence time is defined as second data, the first management unit transmits the test data to the data server in order from the second data instead of the first data when the communication state meets the setting condition again.

6. The collecting apparatus of claim 1, and further comprising a first storage unit storing the collected test data, a first communication unit transmitting the test data stored in the first storage unit to a data server, and a first management unit controlling the first communication unit, the first management unit obtains, from the data server, missing information to determine whether the test data is missing, and the first management unit controls the first communication unit to retransmit the test data to the data server when there is a difference between the data transmitted to the data server and the data received by the data server through analysis of the missing information.

7. The collecting apparatus of claim 6, wherein the missing information includes time interval information, the first management unit determines a specific time interval in which missing of data occurs by using the time interval information, and the first management unit controls the first communication unit to retransmit the test data transmitted at the specific time interval to the data server.

8. A collecting apparatus comprising:

at least one processor and at least one memory comprising instructions stored thereon which when executed by the at least one processor configure a data server keeping test data generated in a specific test space, a second communication unit receiving the test data from a collector collecting the test data is provided in the specific test space, and a second storage unit storing the test data received by the second communication unit, and a second management unit obtaining metadata including indexing information from a handler of an administrator, wherein the second management unit subdivides the test data received through the second communication unit to match the indexing information, the test data is formed to be searched by using the indexing information through subdivision, and the second management unit stores the test data subdivided according to the indexing information in the second storage unit.

9. The collecting apparatus of claim 8, wherein the second management unit monitors a communication load of the second communication unit or an available capacity of the second storage unit, and the second management unit determines whether to receive the test data according to the communication load or the available capacity.

10. The collecting apparatus of claim 8, wherein, the second management unit predicts a required capacity corresponding to a storage capacity required for storing the test data through analysis of the metadata, and the second management unit allocates a space in which the test data is to be stored in the second storage unit when the second storage unit meets a required capacity.

11. The collecting apparatus of claim 10, wherein the second management unit determines first identification information of the specific test space through the analysis of the metadata, the second management unit analyzes an existing test data keeping history of the first identification information, and the second management unit predicts, as the required capacity, a capacity acquired by adding a value of a setting ratio to an average value of the storage capacity through the analysis of the keeping history.

12. The collecting apparatus of claim 8, wherein the second management unit determines whether missing data is present when the test data is stored in the second storage unit,
- the second management unit receives confirmation information used for confirming whether the missing data is present from the collector,
- the second management unit compares related information of the test data stored in the second storage unit, and the confirmation information, and
- the second management unit requests retransmission of the missing data to the collector when it is determined that the missing data is present through the comparison between the related information and the confirmation information.

13. The collecting apparatus of claim 8, wherein the second management unit monitors a communication state between the collector and the second communication unit, and
- the second management unit requests the collector to transmit the test data after the collection of the test data is terminated when the communication state does not meet a setting condition.

14. The collecting apparatus of claim 8, wherein the second
- management unit obtains a first identification information of the specific test spaces,
  - the second management unit determines a second identification information of an object included in the specific test spaces and generating the test data through an analysis of the first identification information or the test data,
  - the second management unit predicts indexing information of the test data through the analysis of the second identification information, and
  - the second management unit automatically indexes the test data according to the indexing information.

15. The collecting apparatus of claim 8, wherein the management unit processes the test data received through the second communication unit,
- the second management unit performs at least one of a first processing, a second processing, a third processing, a fourth processing, and a fifth processing,
- the first processing includes a process of deleting unnecessary among the test data,
- the second processing includes a processing of generating n-dimensional information wherein, n is a natural number of 1 or more, and n<m by using some of m-dimensional information wherein, m is a natural number of 2 or more,
- the third processing includes a processing of graphing text information,
- the fourth processing includes a processing of calculating a representative of the test data, and
- the fifth processing includes a processing of estimating a location of a tested body in an image or a moving picture included in the test data, or extracting a feature point for recognizing the tested body, and
- the second storage unit stores an original test data received through the second communication, and at a same time, additionally stores the data processed by the second management unit.

16. The collecting apparatus of claim 8, wherein the second management unit receives a request for transmission the test data stored in the second storage unit from a handler of an administrator,
- the second management unit extracts test data matching the request from the handler from the second storage unit,
- the second management unit schematizes the test data extracted from the storage unit, and
- the second management unit transmits the schematized test data to the handler.

17. A collecting method performed by a collecting apparatus, the collecting method comprising:
- an acquisition step of acquiring test data generated in a specific test space;
- a processing step of processing the test data; and
- a storing step of storing a original test data, and at a same time, additionally storing the processed test data processed in the processing step,
- wherein in the processing step, at least one of a first processing, a second processing, a third processing, a fourth processing, and a fifth processing is performed,
- the first processing includes a process of deleting unnecessary among the test data,
- the second processing includes a processing of generating n-dimensional information wherein, n is a natural number of 1 or more, and n<m by using some of m-dimensional information wherein, m is a natural number of 2 or more,
- the third processing includes a processing of graphing text information,
- the fourth processing includes a processing of calculating a representative of the test data, and
- the fifth processing includes a processing of estimating a location of a tested body in an image or a moving picture included in the test data, or extracting a feature point for recognizing the tested body.

* * * * *